United States Patent
Tripathi et al.

(10) Patent No.: US 7,515,596 B2
(45) Date of Patent: Apr. 7, 2009

(54) FULL DATA LINK BYPASS

(75) Inventors: Sunay Tripathi, San Jose, CA (US); Nicolas G. Droux, Rio Rancho, NM (US); Eric T. Cheng, San Mateo, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 468 days.

(21) Appl. No.: 11/480,069

(22) Filed: Jun. 30, 2006

(65) Prior Publication Data
US 2008/0002731 A1    Jan. 3, 2008

(51) Int. Cl.
*H04L 12/28* (2006.01)
*H04L 12/66* (2006.01)

(52) U.S. Cl. .................. 370/401; 370/419; 370/463
(58) Field of Classification Search .......... 370/252, 370/254, 255, 400, 401, 412, 419, 463
See application file for complete search history.

(56) References Cited

U.S. PATENT DOCUMENTS

| | | | |
|---|---|---|---|
| 6,041,053 A | 3/2000 | Douceur et al. | |
| 6,070,219 A | 5/2000 | McAlpine et al. | |
| 6,163,539 A | 12/2000 | Alexander et al. | |
| 6,377,992 B1 * | 4/2002 | Plaza Fernandez et al. | 709/227 |
| 6,477,643 B1 | 11/2002 | Vorbach et al. | |
| 6,600,721 B2 | 7/2003 | Edholm | |
| 6,714,960 B1 | 3/2004 | Bitar et al. | |
| 6,757,731 B1 | 6/2004 | Barnes et al. | |
| 6,831,893 B1 | 12/2004 | Ben Nun et al. | |
| 6,859,841 B2 | 2/2005 | Narad et al. | |
| 6,944,168 B2 | 9/2005 | Paatela et al. | |
| 7,046,665 B1 | 5/2006 | Walrand et al. | |
| 7,177,311 B1 | 2/2007 | Hussain et al. | |
| 7,260,102 B2 | 8/2007 | Mehrvar et al. | |
| 7,313,142 B2 | 12/2007 | Matsuo et al. | |
| 2003/0037154 A1 | 2/2003 | Poggio et al. | |
| 2005/0135243 A1 | 6/2005 | Lee et al. | |
| 2005/0138620 A1 | 6/2005 | Lewites | |
| 2006/0041667 A1 | 2/2006 | Ahn et al. | |

(Continued)

OTHER PUBLICATIONS

"Solaris Networking—The Magic Revealed (Part I)"; Sunay Tripathi's Solaris Networking Weblog: Nov. 14, 2005, pp. 1-22 (22 pages).

(Continued)

*Primary Examiner*—Hong Cho
(74) *Attorney, Agent, or Firm*—Osha • Liang LLP

(57) ABSTRACT

A system for processing a packet, including a network interface card (NIC), including a plurality of hardware receive rings, a classifier configured to classify the packet and send the packet to one of the plurality of hardware receive rings, and a host, operatively connected to the NIC, including a virtual network stack including a virtual serialization queue, a virtual network interface card (VNIC) associated with the virtual serialization queue, a device driver associated with the VNIC and configured to store a function pointer and a token associated with one of the plurality of hardware receive rings, where the VNIC is configured to perform at least one selected from a group consisting of enabling bypass mode and disabling bypass mode by changing the function pointer stored in the device driver, where the function pointer is used to send the packet to the virtual serialization queue if the bypass mode is enabled.

20 Claims, 4 Drawing Sheets

U.S. PATENT DOCUMENTS

2006/0045089 A1* 3/2006 Bacher et al. ............ 370/392
2006/0070066 A1   3/2006 Grobman
2006/0174324 A1   8/2006 Zur et al.
2006/0209718 A1* 9/2006 Kinsey et al. ............ 370/254

OTHER PUBLICATIONS

Dovrolis, C., Thayer, B. and Ramanathan, P.: "Hybrid Interrupt—Polling for the Network Interface", ACM SIGOPS Operating Systems Review, vol. 35, Iss. 4, Oct. 2001, (11 Pages).

* cited by examiner

FULL DATA LINK BYPASS

CROSS-REFERENCE TO RELATED APPLICATIONS

The present application contains subject matter that may be related to the subject matter in the following U.S. applications filed on Apr. 22, 2005, and assigned to the assignee of the present application: "Method and Apparatus for Managing and Accounting for Bandwidth Utilization Within A Computing System" with U.S. application Ser. No. 11/112,367; "Method and Apparatus for Consolidating Available Computing Resources on Different Computing Devices" with U.S. application Ser. No. 11/112,368; "Assigning Higher Priority to Transactions Based on Subscription Level" with U.S. application Ser. No. 11/112,947; "Method and Apparatus for Dynamically Isolating Affected Services Under Denial of Service Attack" with U.S. application Ser. No. 11/112,158; "Method and Apparatus for Improving User Experience for Legitimate Traffic of a Service Impacted by Denial of Service Attack" with U.S. application Ser. No. 11/112,629; "Method and Apparatus for Limiting Denial of Service Attack by Limiting Traffic for Hosts" with U.S. application Ser. No. 11/112,328; "Hardware-Based Network Interface Per-Ring Resource Accounting" with U.S. application Ser. No. 11/112,222; "Dynamic Hardware Classification Engine Updating for a Network Interface" with U.S. application Ser. No. 11/112,934; "Network Interface Card Resource Mapping to Virtual Network Interface Cards" with U.S. application Ser. No. 11/112,063; application Ser. No. 11/112,063; "Network Interface Decryption and Classification Technique" with U.S. application Ser. No. 11/112,436; "Method and Apparatus for Enforcing Resource Utilization of a Container" with U.S. application Ser. No. 11/112,910; "Method and Apparatus for Enforcing Packet Destination Specific Priority Using Threads" with U.S. application Ser. No. 11/112,584; "Method and Apparatus for Processing Network Traffic Associated with Specific Protocols" with U.S. application Ser. No. 11/112,228

The present application contains subject matter that may be related to the subject matter in the following U.S. applications filed on Oct. 21, 2005, and assigned to the assignee of the present application: "Method and Apparatus for Defending Against Denial of Service Attacks" with U.S. application Ser. No. 11/255,366; "Router Based Defense Against Denial of Service Attacks Using Dynamic Feedback from Attacked Host" with U.S. application Ser. No. 11/256,254; and "Method and Apparatus for Monitoring Packets at High Data Rates" with U.S. application Ser. No. 11/226,790.

The present application contains subject matter that may be related to the subject matter in the following U.S. applications filed on Jun. 30, 2006, and assigned to the assignee of the present application: "Network Interface Card Virtualization Based On Hardware Resources and Software Rings" with U.S. application Ser. No. 11/479,046; "Method and System for Controlling Virtual Machine Bandwidth" with U.S. application Ser. No. 11/480,000; "Virtual Switch" with U.S. application Ser. No. 11/480,261; "System and Method for Virtual Network Interface Cards Based on Internet Protocol Addresses" with U.S. application Ser. No. 11/479,997; "Virtual Network Interface Card Loopback Fastpath" with U.S. Application Ser. No. 11/479,946; "Bridging Network Components" with U.S. application Ser. No. 11/479,948; "Reflecting the Bandwidth Assigned to a Virtual Network Interface Card Through Its Link Speed" with U.S. application Ser. No. 11/479,161; "Method and Apparatus for Containing a Denial of Service Attack Using Hardware Resources on a Virtual Network Interface Card" with U.S. application Ser. No. 11/480,100; "Virtual Network Interface Cards with VLAN Functionality" with U.S. application Ser. No. 11/479,998; "Method and Apparatus for Dynamic Assignment of Network Interface Card Resources" with U.S. application Ser. No. 11/479,817; "Generalized Serialization Queue Framework for Protocol Processing" with U.S. application Ser. No. 11/479,947; "Serialization Queue Framework for Transmitting Packets" with U.S. application Ser. No. 11/479,143.

BACKGROUND

Network traffic is transmitted from a network, such as the Internet, from a sending system (e.g., a computer system) to a receiving system (e.g., a computer system) via a network interface card (NIC). The NIC is a piece of hardware found in a typical computer system that includes functionality to send and receive network traffic. Typically, network traffic is transmitted in the form of packets, where each packet includes a header and a payload. The header contains information regarding the source address, destination address, size, transport protocol used to transmit the packet, and various other identification information associated with the packet. The payload contains the actual data to be transmitted from the network to the receiving system.

Each of the packets sent between the sending system and receiving system is typically associated with a connection. The connection ensures that packets from a given process on the sending system reach the appropriate process on the receiving system. Packets received by the receiving system (via a NIC associated with the receiving system) are analyzed by a classifier to determine the connection associated with the packet.

Typically, the classifier includes a connection data structure that includes information about active connections on the receiving system. The connection data structure may include the following information about each active connection: (i) the queue associated with the connection; and (ii) information necessary to process the packets on the queue associated with the connection.

Depending on the implementation, the connection data structure may include additional information about each active connection. Such queues are typically implemented as first-in first-out (FIFO) queues and are bound to a specific central processing unit (CPU) on the receiving computer system. Thus, all packets for a given connection are placed in the same queue and are processed by the same CPU. In addition, each queue is typically configured to support multiple connections.

Once the classifier determines the connection associated with the packets, the packets are sent to a temporary data structure (e.g., a receive ring on the NIC) and an interrupt is issued to the CPU associated with the queue. In response to the interrupt, a thread associated with the CPU (to which the serialization queue is bound) retrieves the packets from the temporary data structure and places them in the appropriate queue. Once packets are placed in the queue, those packets are processed in due course. In some implementations, the queues are implemented such that only one thread is allowed to access a given queue at any given time.

SUMMARY

In general, in one aspect, the invention relates to a method for processing packets using a virtual network interface card (VNIC), including associating a first token with a hardware receive ring, where the first token identifies a virtual serialization queue in a virtual network stack, receiving a packet destined for the virtual serialization queue, sending the packet to the hardware receive ring, if the VNIC is operating in bypass mode, then perform associating a first function with the hardware receive ring, where the first function associated with the virtual network stack is executing on a host, calling the first function, where calling the first function includes sending the packet directly to the virtual network stack, and receiving the packet by the virtual serialization queue, if the VNIC is not operating in bypass mode, then perform associating a second function with the hardware receive ring, where the second function is associated with the VNIC, calling the second function, where calling the second function includes sending the packet to the VNIC, receiving the packet by the VNIC, processing the packet by the VNIC to obtain a processed packet, sending the processed packet to the virtual serialization queue, and receiving the packet by the virtual serialization queue.

In general, in one aspect, the invention relates to a system for processing a packet, including a network interface card (NIC), including a plurality of hardware receive rings, a classifier configured to classify the packet and send the packet to one of the plurality of hardware receive rings, and a host, operatively connected to the NIC, including a virtual network stack including a virtual serialization queue, a virtual network interface card (VNIC) associated with the virtual serialization queue, a device driver associated with the VNIC and configured to store a function pointer and a token associated with at least one of the plurality of hardware receive rings, where the VNIC is configured to perform at least one selected from a group consisting of enabling bypass mode and disabling bypass mode by changing the function pointer stored in the device driver, where the function pointer is used to send the packet to the virtual serialization queue if the bypass mode is enabled.

Other aspects of the invention will be apparent from the following description and the appended claims.

DETAILED DESCRIPTION

Figure 1:
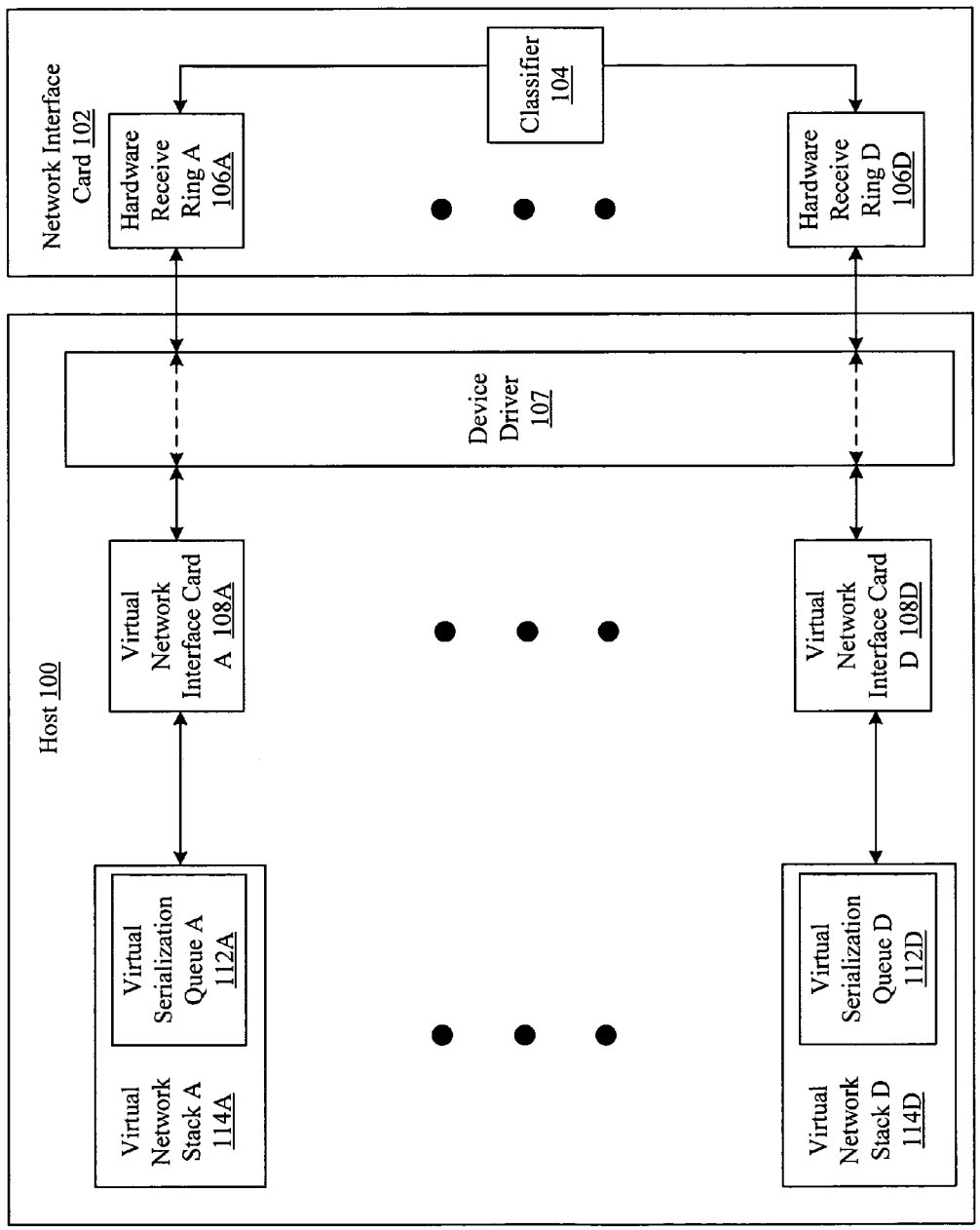
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system to bypass the data link layer. Specifically, embodiments of the invention provide a method and system to bypass the data link layer using a token and a function pointer.

FIG. 1 shows a system in accordance with one embodiment of the invention. As shown in FIG. 1, the system includes a host (100) operatively connected to a NIC (102). The NIC (102) provides an interface between the host (100) and a network (not shown) (e.g., a local area network, a wide area network, a wireless network, etc.). More specifically, the NIC (102) includes a network interface (NI) (i.e., the hardware on the NIC used to interface with the network). For example, the NI may correspond to an RJ-45 connector, a wireless antenna, etc. The packets received by the NI are then sent to other components on the NIC (102) for processing. In one embodiment of the invention, the NIC (102) includes a classifier (104) and one or more hardware receive rings (106A, 106D). In one embodiment of the invention, the hardware receive rings (106A, 106D) correspond to portions of memory within the NIC (102) used to temporarily store the received packets. In one embodiment of the invention, the classifier (104) is configured to analyze the incoming network traffic, typically in the form of packets, received from the network (not shown).

In one embodiment of the invention, analyzing individual packets includes determining to which of the hardware receive rings (106A, 106D) each packet is sent. In one embodiment of the invention, analyzing the packets by the classifier (104) includes analyzing one or more fields in each of the packets to determine to which of the hardware receive rings (106A, 106D) the packets are sent. As an alternative, the classifier (104) may use the contents of one or more fields in each packet as an index into a data structure that includes information necessary to determine to which receive ring (106A, 106D) that packet is sent. The classifier (104) may be implemented entirely in hardware (i.e., the classifier (104) may be a separate microprocessor embedded on the NIC (102)). Alternatively, the classifier (104) may be implemented in software stored in memory (e.g., firmware, etc.) on the NIC and executed by a microprocessor on the NIC (102).

In one embodiment of the invention, the host (100) may include the following components: a device driver (107), one or more virtual NICs (108A, 108D), one or more virtual network stacks (114A, 114D) including one or more virtual serialization queues (112A, 112D), one or more packet destinations (e.g., containers and/or services) (not shown) and/or one or more virtual machines (not shown). In one embodiment of the invention, the device driver (107) provides an interface between the hardware receive rings (106A, 106D) and the host (100). More specifically, the device driver (107) exposes the hardware receive rings (106A, 106D) to the host (100). In one embodiment of the invention, the device driver (107) may maintain a metadata structure (e.g., schema, table, index, view, etc.) for each of the hardware receive rings (106A, 106D).

In one embodiment of the invention, each of the virtual NICs (108A, 108D) is associated with one or more hardware receive rings (106A, 106D). The virtual NICs (108A, 108D) provide an abstraction layer between the NIC (102) and the various packet destinations (or virtual machines) executing on the host (100). The virtual NICs (108A, 108D) may be considered the data link layer of the host (100). Each virtual NIC (108A, 108D) operates like a NIC (102). For example, in one embodiment of the invention, each virtual NIC (108A, 108D) is associated with one or more Internet Protocol (IP) addresses, and one or more Media Access Control (MAC) addresses. Further, each virtual NIC (108A, 108D) may be optionally associated with one or more ports, and/or configured to handle one or more protocol types. Thus, while the host (100) may be operatively connected to a single NIC (102), packet destinations (or virtual machines) executing on the host (100)) operate as if the host (100) is bound to multiple NICs.

Each virtual NIC (108A, 108D) is operatively connected to a corresponding virtual network stack (114A, 114D). Each virtual network stack (114A, 114D) includes network layer functionality. In one embodiment of the invention, network layer functionality corresponds to functionality to manage packet addressing and delivery on a network (e.g., functionality to support IP, Address Resolution Protocol (ARP), Internet Control Message Protocol, etc.). Further, each virtual network stack (114A, 114D) may also include functionality, as needed, to perform additional processing on the incoming and outgoing packets. This additional processing may include, but is not limited to, cryptographic processing, firewall routing, etc.

In one embodiment of the invention, each virtual network stack (114A, 114D) includes a virtual serialization queue (e.g., Virtual Serialization Queue A (112A), Virtual Serialization Queue D (112D), respectively). Further, each virtual serialization queue (112A, 112D) is configured to send and receive packets from an associated virtual NIC (108A, 108D). In addition, each virtual serialization queue (112A, 112D) is configured to send and receive packets from one or more associated packet destinations (or virtual machines) (not shown).

In one embodiment of the invention, the host (100) may include one or more CPUs (not shown). Further, each virtual serialization queue (112A, 112D) is bound to one of the CPUs. Those skilled in the art will appreciate that any number of virtual serialization queues may be bound to a CPU. The host (100) may also include one or more packet destinations (or virtual machines). In one embodiment of the invention, the packet destination(s) corresponds to any process or group of processes executing on the host that sends and receives network traffic, where the packet destination does not include a virtual network stack. Examples of packet destinations include, but are not limited to containers, services (e.g., web server), etc.

In one embodiment of the invention, the virtual NIC (108A, 108D) may be bound to a virtual machine (e.g., Xen Domain) instead of a virtual network stack (114A, 114D). In such cases, the virtual NIC is bound to an interface (e.g., a Xen interface), where the interface enables the virtual NIC to communicate to with the virtual machine. In one embodiment of the invention, the aforementioned virtual machine includes its own virtual network stack and includes its own operating system (OS) instance, which may be different than the OS executing on the host.

Figure 2:
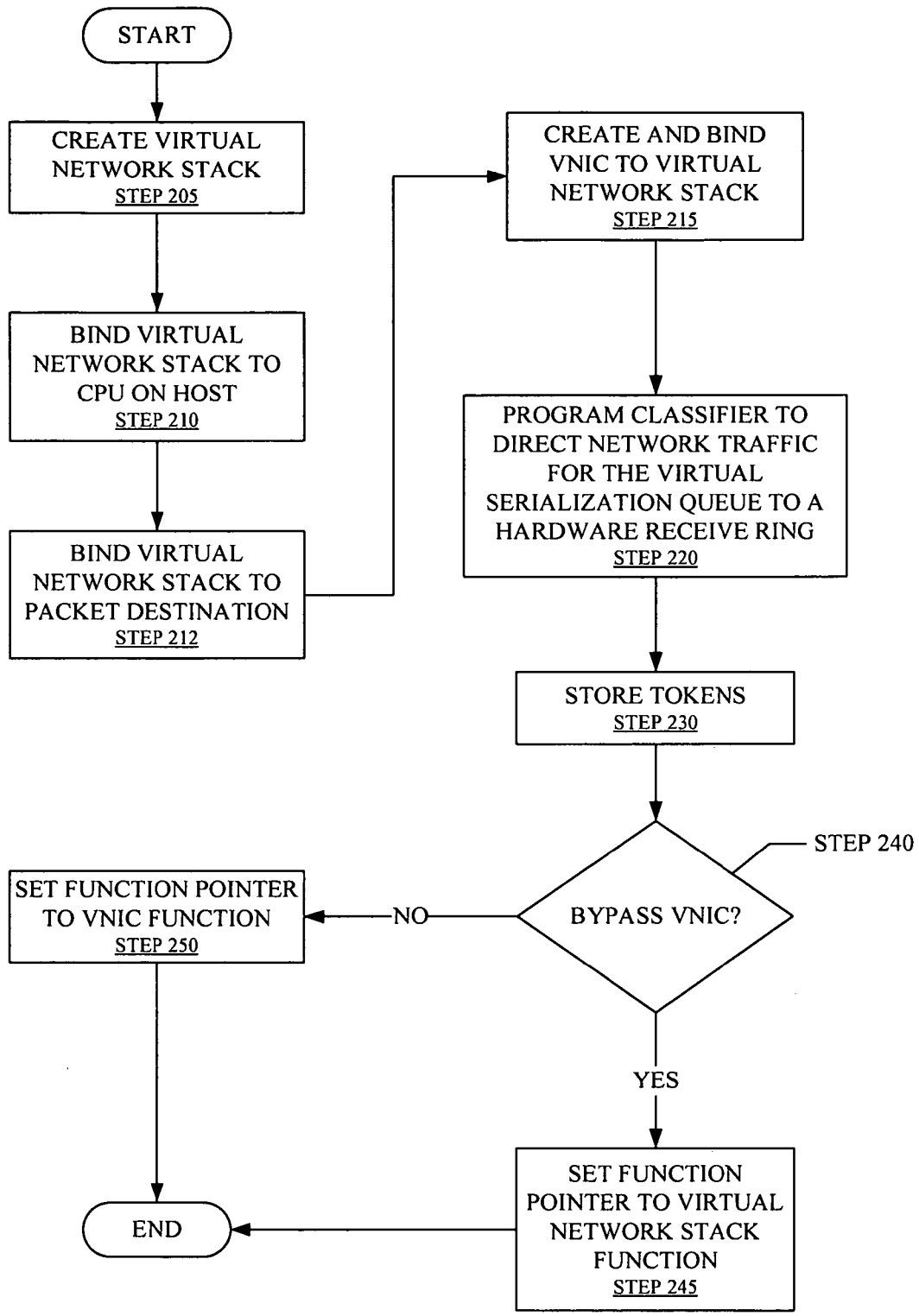
FIGS. 2 and 3 show flowcharts in accordance with one or more embodiments of the invention.

FIG. 2 shows a flowchart in accordance with one embodiment of the invention. Initially, a virtual network stack (including a virtual serialization queue) is created (STEP 205). The virtual serialization queue is subsequently bound to a CPU on the host (STEP 210). Those skilled in the art will appreciate that the virtual serialization queue created in STEP 205 may be implicitly bound to a CPU upon creation.

At this stage, the virtual serialization queue is bound to a packet destination (STEP 212). Those of ordinary skill in the art will appreciate that the packet destination may be bound to the virtual serialization queue any time after the virtual serialization queue has been created.

In STEP 215, a virtual NIC is created and bound to the virtual network stack. The classifier is subsequently programmed such that network traffic for the virtual serialization queue created in STEP 205 is directed to a particular hardware receive ring by the classifier (STEP 220). In STEP 230, a token identifying the virtual serialization queue is stored in the metadata structure (discussed above) associated with the hardware receive ring. Similarly, a token identifying the hardware receive ring is stored in the corresponding virtual serialization queue. In one embodiment of the invention, at least one of the tokens is a cookie.

In STEP 240, a determination is made whether incoming packets destined for the virtual serialization queue may be delivered directly to the virtual network stack without using the virtual NIC. In other words, it is determined whether incoming packets destined for the virtual serialization queue may bypass the virtual NIC. In one embodiment of the invention, incoming packets destined for the virtual serialization queue may bypass the virtual NIC providing the packets are destined solely for the virtual serialization queue (e.g., no other component on the host is monitoring the incoming packets, the packets themselves are not intended for other destinations besides the virtual serialization queue, etc.).

If it is determined in STEP 240 that the packets destined for the virtual serialization queue may bypass the virtual NIC, then a function pointer may be placed in the metadata structure associated with the hardware receive ring (STEP 245). The function pointer may be used to call a function in the virtual network stack to process an incoming packet (discussed below).

If it is determined in STEP 240 that the packets destined for the virtual serialization queue must use the virtual NIC (e.g., other components on the host are monitoring the incoming packets, the packets are destined for other destinations besides the virtual serialization queue, etc.), then a function pointer may be placed in the metadata structure associated with the hardware receive ring (STEP 250). The function pointer in STEP 250, however, is used to call a function in the virtual NIC to process an incoming packet (discussed below).

In one embodiment of the invention, the host may change the function pointer in the metadata structure associated with the hardware receive ring at any time. In one embodiment of the invention, the change may occur by replacing the existing function pointer with a different function pointer. For example, if the virtual NIC is currently being bypassed (i.e., the VNIC is in bypass mode) and one or more components on the host are to begin monitoring the packets, the VNIC may replace the existing function pointer with a new function pointer. The new function pointer may call a function in the virtual NIC to enable monitoring of the packets (i.e., disable bypass mode). Similarly, if the packets destined for the virtual serialization queue are presently being monitored and there is no longer a requirement to monitor the packets, the existing function pointer may be replaced with a new function pointer that directly calls a function in the virtual network stack, enabling bypass mode.

Figure 3:
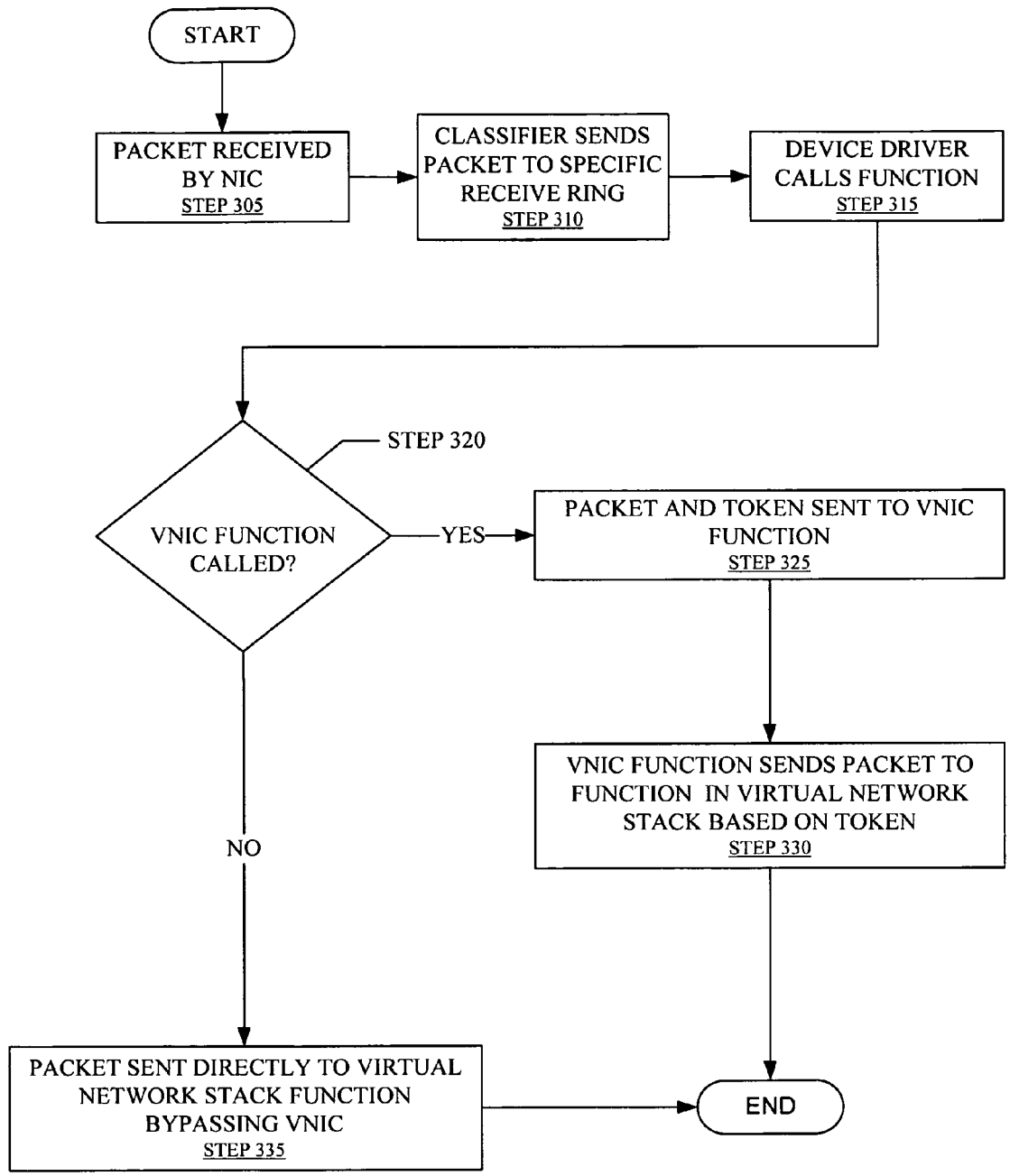

FIG. 3 shows a flowchart in accordance with one embodiment of the invention. Initially, a packet is received by the NIC (STEP 305). A classifier sends the packet to the appropriate hardware receive ring following analysis of the packet (STEP 310). At this stage, the function referenced by the stored function pointer is called by the device driver (STEP 315). In one embodiment of the invention, the function may only be called if the hardware receive ring is polled. In one embodiment of the invention, the function may only be called following the generation of an interrupt.

If the called function belongs to the virtual NIC (STEP 320) (discussed above), then the token stored in the metadata structure and the packet are sent to the virtual NIC function for processing (STEP 325). In one embodiment of the invention, processing the packet by the virtual NIC function includes calculating a statistic based on the packet (e.g, the number packets received per unit time). In one embodiment of the invention, the virtual NIC function sends the packet to a function in the virtual network stack based on the token for both further processing and to deliver the packet to the virtual serialization queue (STEP 330). In other words, the virtual NIC function has minimal processing because the token already provides the target destination in the virtual network stack for the packet.

If the called function belongs to the virtual network stack (STEP 320) (i.e., the VNIC is in bypass mode), then the packet is sent directly to the virtual network stack function for processing and subsequent delivery of the processed packet to the virtual serialization queue. In other words, the packet bypasses the virtual NIC. In one embodiment of the invention, the virtual stack function calculates a statistic based on the packet (e.g, the number of packets received per unit time). In one embodiment of the invention, the statistic may be accessed (e.g., via an application programming interface (API)) by other components on the host.

As discussed above, in one embodiment of the invention, the called function (e.g., FIG. 3, STEP 315) may not be called prior to the hardware receive ring being polled. In one embodiment of the invention, the hardware receive ring is polled by one or more polling functions associated with the virtual serialization queue. When the virtual NIC is in bypass mode, a polling function that polls the hardware receive ring by directly accessing the device driver (e.g., Device Driver (107)) may be used. When the virtual NIC is not in bypass mode, a polling function that accesses the device driver using the virtual NIC to poll the hardware receive ring may be used. In one embodiment of the invention, when the virtual NIC is not running in bypass mode, the token of the virtual serialization queue (e.g., the token described above in relation to FIG. 2, STEP 230) may be sent to the virtual NIC to identify the appropriate hardware receive ring for polling. In one embodiment of the invention, the one or more polling functions may be accessed by a function pointer, and the function pointer may be changed when the virtual NIC enables bypass mode and/or disables bypass mode.

Figure 4:
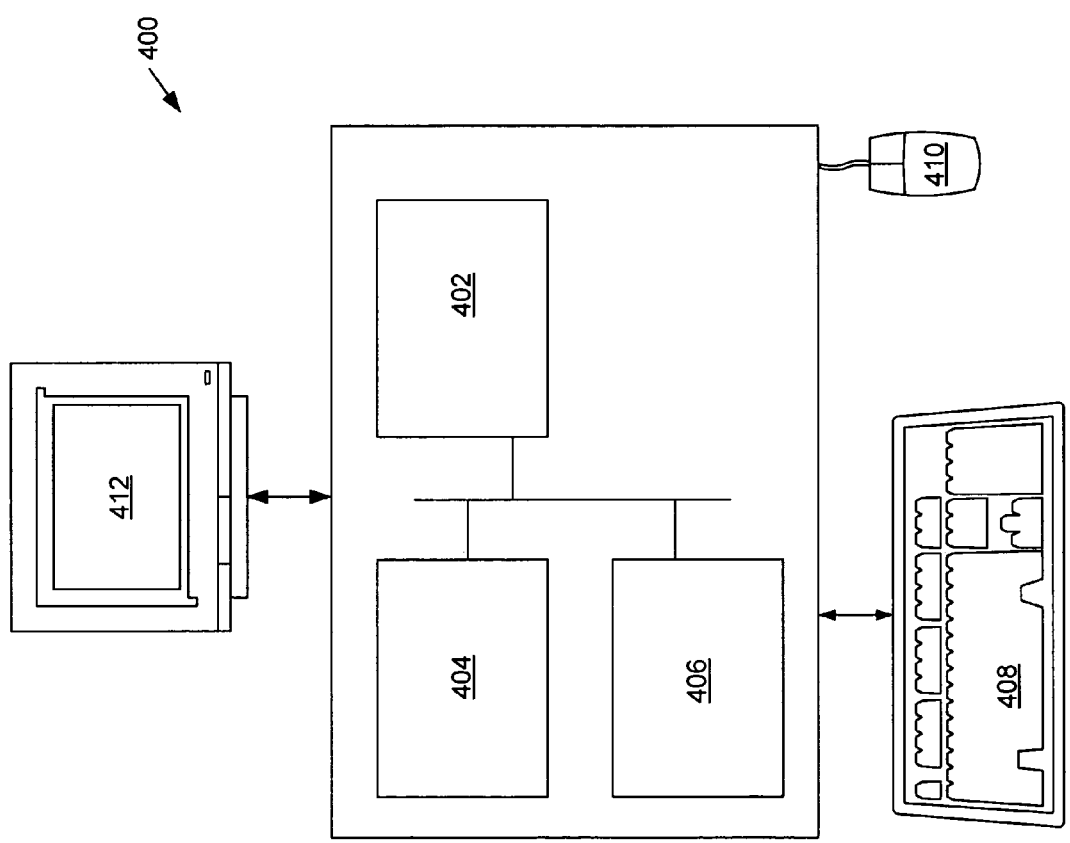
FIG. 4 shows a computer system in accordance with one or more embodiments of the invention.

The invention may be implemented on virtually any type of computer regardless of the platform being used. For example, as shown in FIG. 4, a computer system (400) includes a processor (402), associated memory (404), a storage device (406), and numerous other elements and functionalities typical of today's computers (not shown). The computer (400) may also include input means, such as a keyboard (508) and a mouse (410), and output means, such as a monitor (412). The computer system (400) is connected to a local area network (LAN) or a wide area network (e.g., the Internet) (not shown) via a network interface connection (not shown). Those skilled in the art will appreciate that these input and output means may take other forms. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for processing packets using a virtual network interface card (VNIC), comprising:

associating a first token with a hardware receive ring, wherein the first token identifies a virtual serialization queue in a virtual network stack;

receiving a packet destined for the virtual serialization queue;

sending the packet to the hardware receive ring;

if the VNIC is operating in bypass mode, then perform:
associating a first function with the hardware receive ring, wherein the first function associated with the virtual network stack is executing on a host;
calling the first function, wherein calling the first function comprises
sending the packet directly to the virtual network stack; and
receiving the packet by the virtual serialization queue;

if the VNIC is not operating in bypass mode, then perform:
associating a second function with the hardware receive ring, wherein the second function is associated with the VNIC;
calling the second function, wherein calling the second function comprises sending the packet to the VNIC;
receiving the packet by the VNIC;
processing the packet by the VNIC to obtain a processed packet;
sending the processed packet to the virtual serialization queue; and
receiving the packet by the virtual serialization queue.

2. The method of claim 1, wherein calling the second function further comprises sending the first token to the VNIC.

3. The method of claim 2, wherein the first token is stored in a metadata structure associated with the hardware receive ring.

4. The method of claim 1, wherein the processed packet is sent to the virtual serialization queue using the first token.

5. The method of claim 1, wherein the hardware receive ring is associated with the virtual serialization queue.

6. The method of claim 1, wherein at least one selected from a group consisting of the first function and the second function is called by a device driver executing on the host.

7. The method of claim 1, wherein at least one selected from a group consisting of the first function and the second function is called using a function pointer wherein the function pointer is stored in a metadata structure associated with the hardware receive ring.

8. The method of claim 6, wherein the VNIC performs at least one selected from a group consisting of enabling bypass mode and disabling bypass mode by changing the function pointer.

9. The method of claim 1, wherein at least one selected from a group consisting of the first function and the second function is called following a polling of the hardware receive ring.

10. The method of claim 9, wherein the polling is performed using a polling function associated with the virtual serialization queue.

11. The method of claim 10, wherein the polling is further performed using a second token associated with the virtual serialization queue, wherein the second token identifies the hardware receive ring.

12. The method of claim 1, wherein the first function calculates a statistic involving the first packet.

13. A system for processing a packet, comprising:
a network interface card, comprising:
a plurality of hardware receive rings;

a classifier configured to classify the packet and send the packet to one of the plurality of hardware receive rings based on the classification; and a host, operatively connected to the network interface card, comprising:

a virtual network stack comprising a virtual serialization queue;

a virtual network interface card (VNIC) associated with the virtual serialization queue;

a device driver associated with the VNIC and configured to store a function pointer and a token associated with at least one of the plurality of hardware receive rings, wherein the VNIC is configured to perform at least one selected from a group consisting of enabling bypass mode and disabling bypass mode by changing the function pointer stored in the device driver, wherein the function pointer is used to send the packet to the virtual serialization queue if the bypass mode is enabled.

14. The system of claim 13, wherein the token is stored in a metadata structure.

15. The system of claim 13, wherein the function pointer points to a function associated with the virtual network stack, wherein execution of the function places the packet in the virtual network stack.

16. The system of claim 15, wherein the function is configured to calculate a statistic based on the packet.

17. The system of claim 16, wherein the statistic is accessible by an application programming interface.

18. The system of claim 13, wherein the function pointer references a function associated with the VNIC, wherein the virtual network interface card is operatively connected to at least one of the plurality of hardware receive rings.

19. The system of claim 18, wherein the function is configured to send the packet, using the token, to the virtual network stack.

20. The system of claim 18, wherein the function is configured to calculate a statistic based on the packet.

* * * * *